United States Patent [19]

Cueto et al.

[11] 4,220,306

[45] Sep. 2, 1980

[54] ADJUSTABLE HANGING DEVICE

[76] Inventors: Ronald E. Cueto, 61 Ahmad St., Opa Locka, Fla. 33054; Arthur N. Cohen, 270 NE. 156th St., North Miami Beach, Fla. 33162

[21] Appl. No.: 30,030

[22] Filed: Apr. 13, 1979

[51] Int. Cl.² .............................................. B42F 13/00
[52] U.S. Cl. ................................... 248/328; 24/129 R
[58] Field of Search ............... 248/328, 329, 332, 320, 248/321, 318, 317; 24/129 A, 136 R, 129 R

[56] References Cited

U.S. PATENT DOCUMENTS

| | | | |
|---|---|---|---|
| 354,962 | 12/1886 | Yale | 248/328 |
| 402,130 | 4/1889 | Bedford | 248/328 X |
| 477,522 | 6/1892 | Drayton | 248/328 |
| 659,702 | 10/1900 | Smith | 248/328 |
| 783,743 | 2/1905 | D'Olier | 248/328 |
| 928,469 | 7/1909 | Miles | 24/129 R |
| 1,252,387 | 1/1918 | Bergen | 24/136 R |
| 1,298,562 | 3/1919 | Powers | 248/328 |
| 1,738,907 | 12/1929 | Kleffman | 24/129 A |
| 2,183,265 | 12/1939 | Maloney | 248/322 X |
| 2,572,615 | 10/1951 | Hansen | 248/317 UX |

*Primary Examiner*—J. Franklin Foss

[57] ABSTRACT

An adjustable hanging device for hanging plants and the like having a cord with a hook at its upper end for suspending same, the cord extending downwardly through a bore at one end of a bar and returning upwardly to terminate at a second bore at the other end of the bar with a second hook positioned at the bend of the cord. An object suspended on the second hook such as a plant causes the bar to tilt downwardly and the cord to become crimped at the bar and thereby lock the cord in position. Upon pushing upwardly on the lower end of the tilted bar to a horizontal position by means of a pole, the position of the bar frees the cord and permits the height adjustment of the device.

7 Claims, 3 Drawing Figures

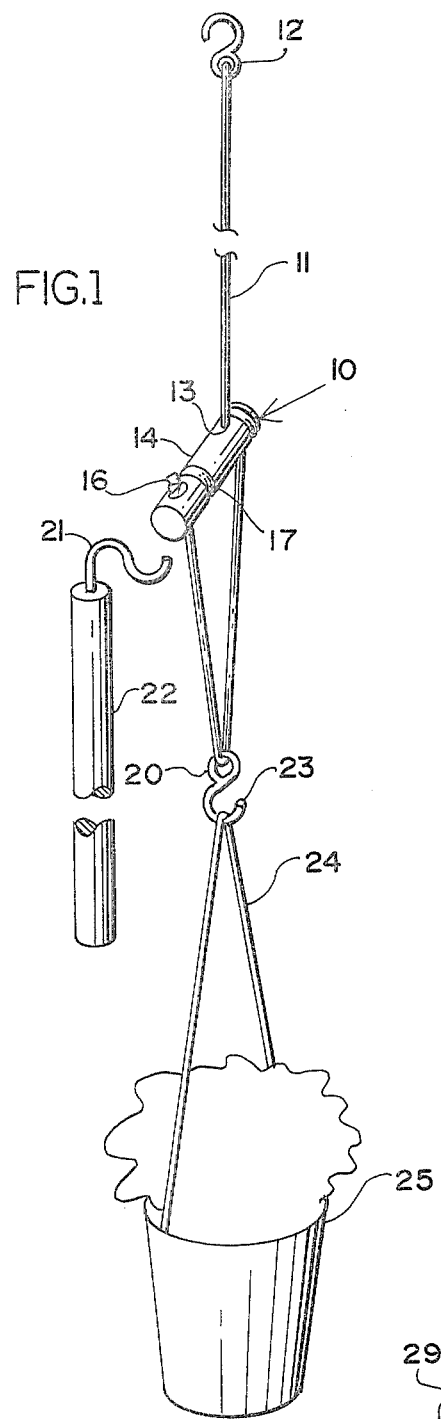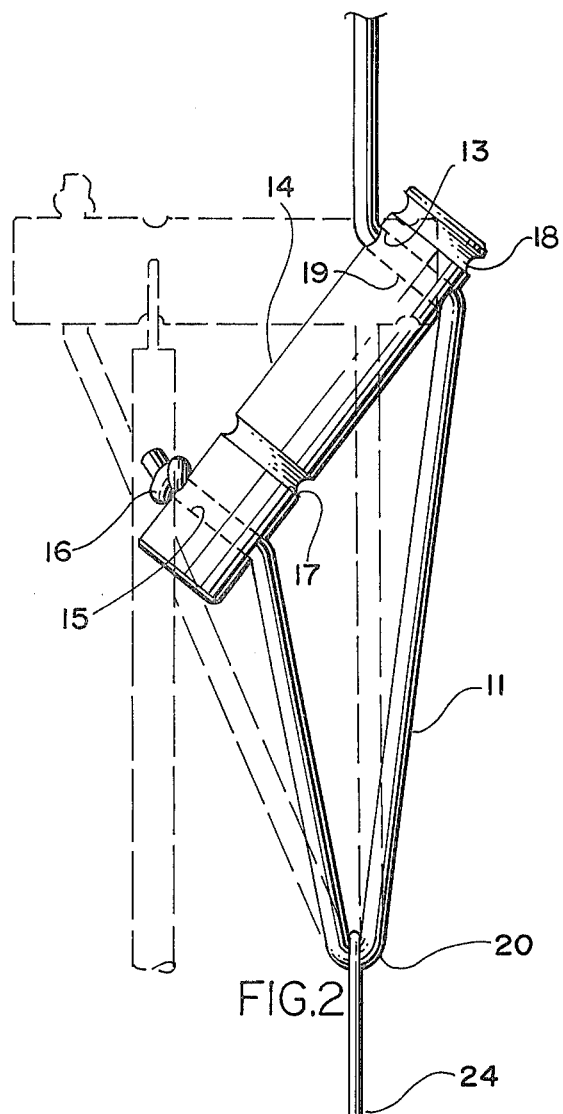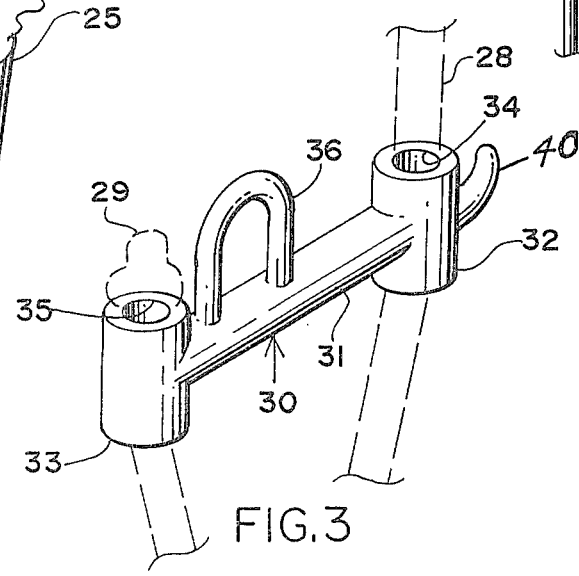

ADJUSTABLE HANGING DEVICE

BACKGROUND OF THE INVENTION

1. Field of the Invention

This invention relates to hanging devices and is more particularly directed to one which is adjustable.

2. Description of the Prior Art

The conventional adjustable hanging device consists of a cord extending upwardly to a pulley and downwardly to a weight for counterbalancing the object being hung or displayed which is secured to the other end of the cord. In this arrangement, there are two objects that are suspended and in view, namely, the object being displayed and a weight which detracts from the view of the object or interferes with the proper hanging of the object. The present invention avoids the objection caused by the use of a counter balancing weight by the use of a bar through which the suspended cord extends and which in one position locks the cord against movement while in a second position permits the movement of the cord to adjust the relative position of the object being suspended.

SUMMARY OF THE INVENTION

Therefore, a principal object of the present invention is to provide a device without use of counter balancing weights for hanging plants and the like which can be readily adjusted as to height.

Another object of the present invention is to provide a device for hanging plants and the like that can be readily reached by means of a pole for the purpose of adjusting as to height, either upwardly or downwardly.

A further object of the present invention is to provide a pole with a hook at one end for engaging a holder to readily adjust the height of the plant hanging device.

With these and other objects in view, the invention will be best understood from a consideration of the following detailed description taken in connection with the accompanying drawing forming a part of this disclosure, with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is a perspective view of a hanging device for plants and the like constructed in accordance with my invention.

FIG. 2 is a fragmentary side elevational view with the dotted lines indicating the device when adjusting the height thereof.

FIG. 3 is a fragmentary perspective view of an alternate construction of my adjustable hanging device.

DESCRIPTION OF THE PREFERRED EMBODIMENTS

Referring to the drawing wherein like numerals are used to designate similar parts throughout the several views, the numeral 10 refers to a hanging device constructed in accordance with my invention and consisting of a cord or line 11 having a hook 12 at the upper end for hanging the device 10, the cord 11 extending downwardly through a bore 13 formed in one end portion of a lock and release bar 14. The cord 11 extends downwardly below the bar 14 and then returns as at 20 upwardly to be received by a second bore 15 positioned at the opposite end of the bar 14. The cord 11 terminates in a knot 16 at the position it emerges from the bore 15 to prevent the cord 11 from slipping therethrough. Off center of the bar 14 and adjacent to the bore 15 there are peripheral grooves 17 and 18 for engagement by an S-shaped hook 21 extending upwardly of a pole 22 of any desired length. Positioned at the bend 20 in the cord 11 is a second hook 23 slidably mounted on the cord 11 upon which the bail 24 of the hanging plant 25 is supported.

In the normal use of my adjustable hanging device, the hook 12 is mounted on a hook or eye bolt from which the device 10 is to be hung and the plant 25 positioned on the lower hook 23. With the device now hanging freely, the bar 14 will assume an angular position with relation to the horizontal as shown by FIG. 1 due to the weight of the plant. The plant 25 will remain stationary at the particular elevated position since the bight 19 of the cord 11 in the bore 13 becomes crimpted and cannot slide through the bore 13 in spite of the downward pull of the plant 25.

However, if it is decided to adjust the vertical position or height of the plant above the floor or ground, the pole 22 is placed against the bar 14 with the free end of the hook 21 engaging the upper portion of the peripheral groove 18. The pole 22 is then pulled downwardly swinging the lower end of the bar 14 upwardly and forcing the bar 14 into a horizontal position. This can be accomplished also by placing the free end of the hook 21 against the lower portion of the peripheral groove 17 and pushing upwardly, as shown by the dotted lines in FIG. 2 of the drawing. The cord 11 along with the bight 19 thereof is in vertical alignment from the hook 12 to the bend 20 thereby making the cord 11 free to slide through the bore 13. By pushing upwardly on the bar 14 with the latter in its horizontal position, the bar 14 will slide upwardly and the cord 11 slides through the bore 13 as the plant 25 is raised to a greater height; or if the bar 14 is pulled downwardly, the plant 25 is lowered. After the plant 25 has been positioned at its desired height, the pole 22 and hook 21 are removed from the bar 14, the weight of the plant 25 causing the bar 14 to assume the previously designated angular position and the cord 11 to again become crimped and locked in position.

An alternate construction of the device 10 is illustrated by FIG. 3 in which the cylindrical bar 14 is substituted by a molded member 30 consisting of a rod 31 at whose ends are mounted cylindrical member 32 and 33 provided with bores 34 and 35 respectively. The cord 28 which hanges vertically in a suspended position extends downwardly through the bore 34 of the cylindrical member 32 and then upwardly through the bore 35 of the cylindrical member 33 where it is knotted as at 29. The rod 31 is provided with a loop shaped handle 36 mounted upwardly of the rod 31 closer to the cylindrical member 33 than to the cylindrical member 32 for engagement by the hook 21 of the pole 22 and a pivot member 40 extending outwardly of the cylindrical member 32.

As in our device 10 described hereinabove, the weight of the plant 25 supported at the bend 20 of the cord 28, will cause the adjustable hanging device 30 to assume an angular position as shown by FIG. 3 causing the bight of the cord 28 within the bore 34 of the cylindrical member 32 to become crimpted and locked therein. Upon inserting the free end of the hook 21 in the loop handle 36 and pushing upwardly thereon, to swing the cylindrical member 33 upwardly and the device 10 assuming a horizontal position to free the bight of the cord 28 in the cylindrical member 32. If it is desired to elevate the article being hung on the cord 28, all that need be done is push upwardly on the pole 22 and the device 30 will slide upwardly as the cord 28 slides downwardly through the bore 34. If it is desired to lower the position of the article being supported on the cord 28, the operator grasps the pole 22, causes the hook 21 to engage the pivot member 40 and then pulls downwardly thereon to cause the hanging device 30 swing clockwise as viewed in FIG. 3 to free the bight of the cord 28. Any further downward force will cause the hanging device 30 to slide downwardly on the cord 28 and the plant which is held by the cord 28 is lowered. When the desired height has been effected, then the hook 21 is released from the pivot member 40 to permit the adjustable hanging device 30 to assume its original angular position and again crimp the bight of the cord at the cylindrical member 32 to lock the cord against any further movement thereof.

What we claim as new and desire to secure by Letters Patent is:

1. An adjustable hanging device comprising a substantially elongated member having end portions, a bore extending through said elongated member at each of said end portions, a pliable member of desired length having a free end, said pliable member extending through one of said bores to beyond said elongated member and returning to extend through the other of said bores, means securing said free end of said pliable member preventing the sliding of said pliable member through said other of said bores and peripheral groove means mounted about said elongated member in closer proximity to said other of said bores for engagement by a pole for positioning said elongated member in a substantially horizontal position whereby said pliable member extending through said one of said bores is free to slide therethrough.

2. The structure as recited by claim 1 wherein said securing means comprises a knot formed on said pliable member.

3. The structure as recited by claim 2 wherein said further means comprises a loop member mounted on said elongated member.

4. The structure as recited by claim 2, taken in combination with a further peripheral groove formed about said elongated member adjacent said one of said bores.

5. The structure as recited by claim 3 taken in combination with a further member extending outwardly of said elongated member adjacent said one of said bores for vertical adjustment of said hanging device.

6. The structure as recited by claim 2 and still further means mounted on said elongated member adjacent said one of said bores for engagement by said pole for vertical movement of said elongated member.

7. The structure as recited by claim 6 wherein said still further means comprises a member extending outwardly therefrom.

* * * * *